(12) United States Patent
Filosa et al.

(10) Patent No.: US 10,347,407 B2
(45) Date of Patent: Jul. 9, 2019

(54) MAGNETIC APPARATUS

(71) Applicant: S.P.D. S.p.A, Caravaggio (BG) (IT)

(72) Inventors: Giuseppe Filosa, Caravaggio (IT);
Matteo Cipolla, Caravaggio (IT);
Giovanni Cosmai, Caravaggio (IT);
Claudio Conti, Caravaggio (IT);
Roberto Amboni, Caravaggio (IT)

(73) Assignee: S.P.D. S.P.A., Caravaggio (BG) (IT)

( * ) Notice: Subject to any disclaimer, the term of this patent is extended or adjusted under 35 U.S.C. 154(b) by 0 days.

(21) Appl. No.: 15/765,414

(22) PCT Filed: Sep. 28, 2016

(86) PCT No.: PCT/IB2016/055798
§ 371 (c)(1),
(2) Date: Apr. 2, 2018

(87) PCT Pub. No.: WO2017/056014
PCT Pub. Date: Apr. 6, 2017

(65) Prior Publication Data
US 2018/0301262 A1 Oct. 18, 2018

(30) Foreign Application Priority Data

Oct. 1, 2015 (IT) .......................... 102015000057348

(51) Int. Cl.
| | |
|---|---|
| *H01F 7/02* | (2006.01) |
| *B23Q 3/154* | (2006.01) |
| *B25B 11/00* | (2006.01) |
| *H01F 7/04* | (2006.01) |
| *H01F 7/20* | (2006.01) |
| *B23Q 17/00* | (2006.01) |

(52) U.S. Cl.
CPC ......... *H01F 7/0252* (2013.01); *B23Q 3/1543* (2013.01); *B23Q 3/1546* (2013.01); *B23Q 17/00* (2013.01); *B23Q 17/005* (2013.01); *B25B 11/002* (2013.01); *H01F 7/0257* (2013.01); *H01F 7/04* (2013.01); *H01F 7/206* (2013.01); *B23Q 2717/00* (2013.01); *H01F 2007/208* (2013.01)

(58) Field of Classification Search
CPC ........ H01F 7/0252–7/0257; H01F 7/04; H01F 7/206; H01F 2007/208; B25B 11/002; B23Q 3/1543; B23Q 3/1546
See application file for complete search history.

(56) References Cited

U.S. PATENT DOCUMENTS

2007/0290780 A1  12/2007  Tiberghien et al.

FOREIGN PATENT DOCUMENTS

| EP | 0929904 A1 | 7/1999 |
| EP | 1419034 A2 | 5/2004 |
| WO | WO2012029073 A1 | 3/2012 |

*Primary Examiner* — Ramon M Barrera
(74) *Attorney, Agent, or Firm* — King & Schickli, PLLC

(57) ABSTRACT

A magnetic apparatus (1) comprising a magnetizable surface (2) configured to anchor a one or more ferromagnetic elements in a removable manner and a plurality of magnetic poles (3), each provided with a free surface (4) thereof, the magnetizable surface (2) being at least partially defined by the free surfaces (4) of said plurality of magnetic poles (3) placed side by side; one part of said magnetic poles (3) has at least two measuring areas (5) on the free surface thereof, each measuring area (5) being associated with at least one sensor (6) adapted to detect a magnetic flux exiting from said area.

11 Claims, 6 Drawing Sheets

MAGNETIC APPARATUS

FIELD OF THE INVENTION

The present invention relates to a magnetic apparatus.

More in particular, it relates to a magnetic apparatus comprising a magnetizable surface configured to anchor one or more ferromagnetic elements in a removable manner.

The magnetizable surface is at least partially defined by the free surfaces of a plurality of mutually side by side magnetic poles.

PRIOR ART

Magnetic locking systems (or magnetic devices) are equipment intended for anchoring ferromagnetic material during machining with machine tools, within the context of moving mechanical workpieces (handling and/or lifting) or for the quick locking of molds.

Some magnetic apparatuses, defined electro-permanent, comprise a magnetic section (called electro-permanent magnetic module), and an electronic activation/deactivation system (called control unit).

The electro-permanent magnetic module comprises a mild steel supporting structure, adapted to contain all the internal components and one or more mild steel polar expansions, of various shapes and features to suit different needs. Polar expansions are also known as magnetic poles.

Each magnetic pole has permanent magnets and reversible magnets associated thereto. Each reversible magnet is coupled to a solenoid which is able to change the polarity of the reversible magnet.

When the field generated by the permanent magnets and by the reversible magnet is added, the magnetizable surface is active. When the field of the permanent magnets and of the reversible ones is subtracted, the magnetizable surface is not active.

The activation solenoids are controlled by a control unit which comprises:
  a controlled bidirectional power rectifier, which provides for suitably supplying the solenoids of the electro-permanent magnetic module;
  one or more control panels in order to allow the operator to activate and deactivate the electro-permanent magnetic module;
  a system management control logic;
  an electrical connection system, typically a cable, to allow the connection between the control unit and the electro-permanent magnetic module.

The control unit's task is to activate/deactivate the electro-permanent magnetic module, through magnetization, demagnetization or polarity reversion operations of a part or all of the reversible magnets contained within the module itself.

Besides the time required to complete the two magnetization operations, the control unit can be electrically disconnected from the magnetic module.

Other magnetic devices are also known that work differently.

For example magnetic devices are known, formed by electromagnets. In this case, in order to obtain the magnetization of the magnetizable surface, coils associated with the plurality of magnetic poles that define magnetizable surface must be supplied continuously.

Other magnetic devices are also known, commonly referred to as 'permanent magnets'. These systems operate by using the magnetic field produced by permanent magnets which do not require the use of electrical devices to be activated.

The magnetic action of the product can be activated or deactivated through a lever that mechanically changes the combination between iron and magnet, arranged below the magnetizable surface. It is the best known and most widely used system for simple handling of ferrous materials, especially because it does not require power supply and maintenance in general.

In all known systems, the anchoring/gripping force is a function of many parameters, such as:
  the air gap, i.e. the air space existing between the magnetizable surface of the magnetic module and the surface of the workpiece to be anchored, which depends for example on the degree of surface finishing of the workpieces;
  the temperature;
  the nature of the material to be anchored;
  the thickness and geometrical shape of the piece to be anchored.

The major manufacturers of magnetic modules provide a multitude of diagrams that show the variation of force in a more or less accurate manner upon the variation of one of the above parameters.

This method should allow a trained operator to always work in perfect safety.

Unfortunately, while for some "derating" conditions (decrease of the anchoring force of the magnetic module) it is simple to check the possible loss of force associated therewith, such as when a low magnetic permeability material is lifted of which the force feature is known, the case is different when one has to estimate the air gap which can form between the magnetic device and the workpiece to be anchored.

Even more complex is the case when the geometry of the workpiece to be anchored is not always the same, and the workpiece cannot be perfectly coupled to the geometry of the magnetic module.

In particular, if the coverage of the magnetic module is only partial and/or the thickness of the workpiece to be anchored changes along the anchoring surface, the determination of the above force is extremely difficult, if not impossible, with the derating graphs alone.

This can cause significant risks to the operators.

Moreover, if the magnetic module is used for anchoring workpieces being machined, an undesired displacement can cause defects in the final machining resulting from the undesired displacement of the workpiece, or accidents.

On the other hand, if the magnetic module is used for anchoring a mold, serious problems may arise during the injection step.

SUMMARY OF THE INVENTION

The object of the present invention is to solve the drawbacks of the prior art.

A further object of the present invention is to provide a magnetic apparatus able to measure the magnetic force actually developed by the magnetic module on the workpiece to be anchored and able to provide an operator or a control unit of the magnetic module with data relating to the force actually developed.

This can simplify the management of conditions in which there are more or less complex combinations of different derating indexes.

This and other objects are achieved by a magnetic apparatus manufactured according to the appended claims.

Advantageously, the information obtained through the present invention can be used in conjunction with other security safety systems to prevent improper operation.

BRIEF DESCRIPTION OF THE FIGURES

Further features and advantages of the invention will become apparent from the description of a preferred but non-exclusive embodiment of the device, shown by way of a non-limiting example in the accompanying drawings, in which.

DETAILED DESCRIPTION OF THE INVENTION

Figure 1:
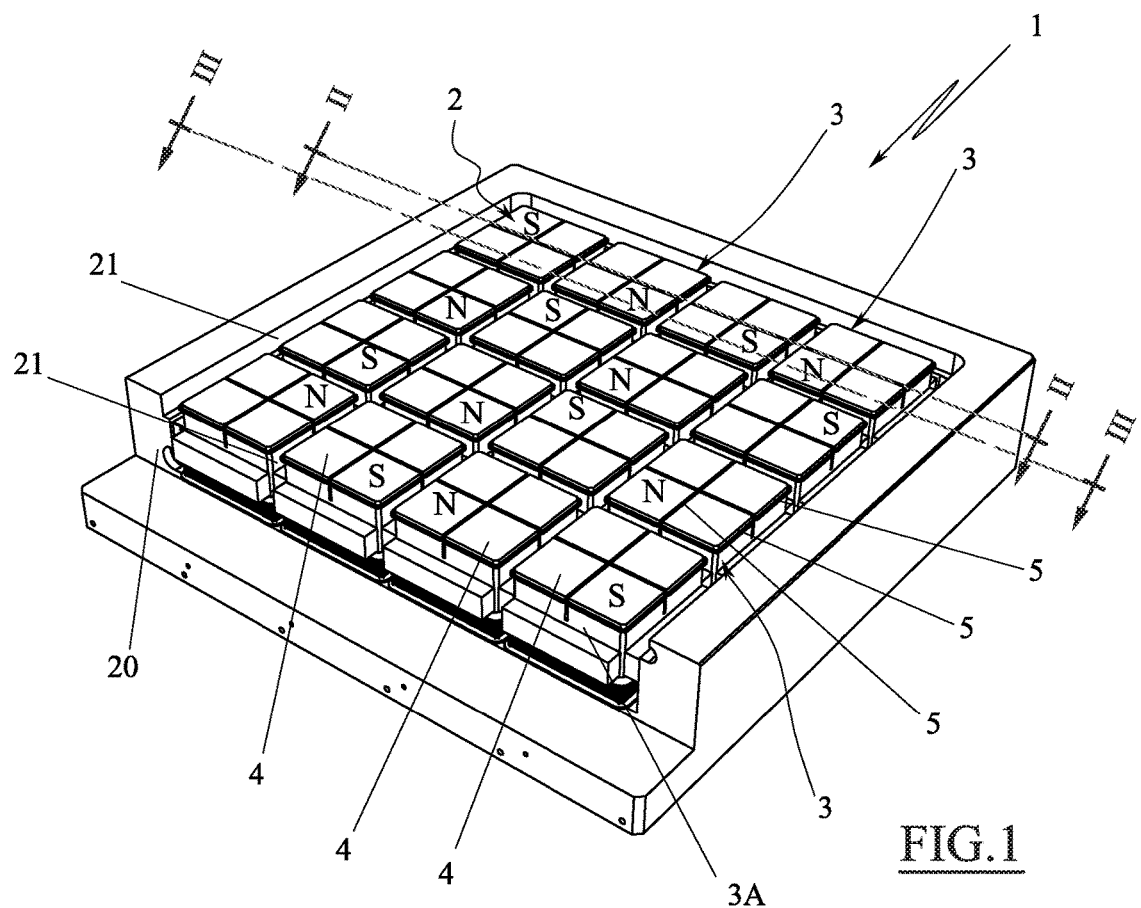
FIG. 1 is a perspective, partially sectional view of a magnetic module of a magnetic apparatus according to the present invention.

With reference to the above figures, a magnetic apparatus is shown, globally denoted by reference numeral 1.

The magnetic apparatus 1 shown in FIG. 1, comprising an electro-permanent magnetizable surface 2 configured to anchor a ferromagnetic element (not shown) in a removable manner.

In the present description, the term 'a ferromagnetic element' will be used for simplicity, which can be understood either as a single element or as a group of one or more ferromagnetic elements simultaneously treated by the magnetic apparatus.

The electromagnetic element intended to be locked by the magnetizable surface 2 can for example be an injection mold, a workpiece to be machined on a numerical control machine, an element intended to be moved between different areas of a workspace, a group of ferromagnetic elements, etc.

The magnetic apparatus 1 comprises a plurality of magnetic poles 3 associated with the magnetizable surface 2 with alternating north N, south S polarity.

Figure 2:
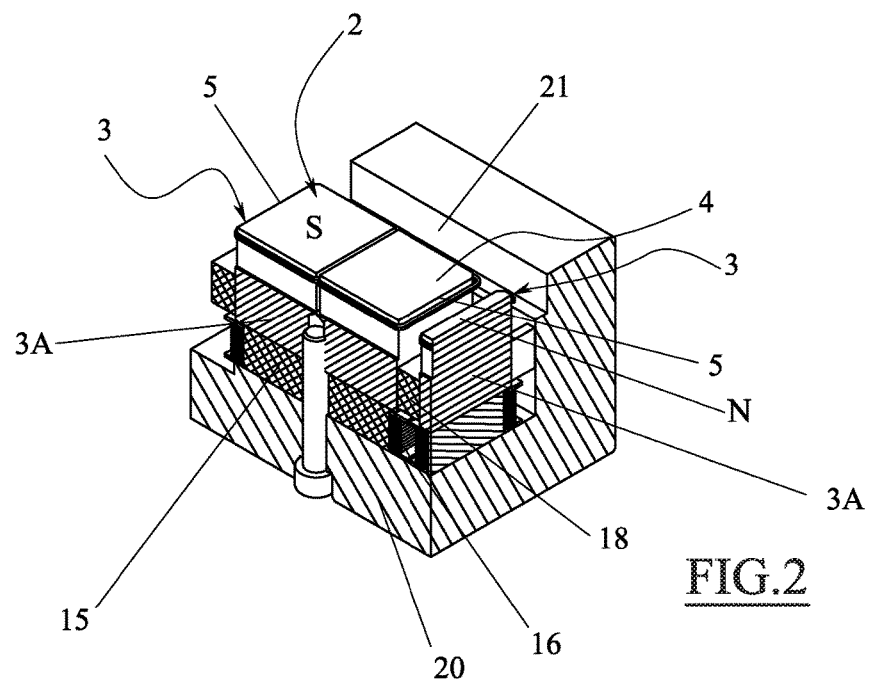
FIG. 2 is a partial section taken along line II-II in FIG. 1.

As can be seen in FIG. 2, two neighboring north N and south S magnetic poles may be short-circuited by means of a casing 20 of the magnetic apparatus 1, which can be made of ferromagnetic material (e.g. mild steel). In the example, the different magnetic poles are constrained by screws to casing 20.

Each magnetic pole 3 is provided with a free surface 4 thereof that is part of the magnetizable surface 2.

In essence, the magnetizable surface 2 is at least partially defined by the free surfaces 4 mutually side by side of the plurality of magnetic poles 3 of the magnetic apparatus 1.

In the example shown in FIG. 1, gaps 21 are provided between the various magnetic poles 3 and between the magnetic poles 3 and casing 20 of apparatus 1, which can be filled with a suitable resin (not shown, for simplicity, in FIG. 1), so that the magnetizable surface 2 is substantially flat and homogeneous.

This prevents the accumulation of dirt and debris of any kind between the different poles of the magnetizable surface 2, which is then superficially free from cracks or slits.

According to alternative embodiments, gaps 21 may also be occupied by one or more sheets made flush with the free surface of the magnetic poles 3, or slightly lowered with respect to the latter. Underneath the sheets it is still possible to provide some resin, as in the cases above. It must be said that in the presence of said sheets, coils 6 can be placed on top of the latter.

In a different embodiment, the magnetizable surface 2 can be formed in a single metal piece. In this case, the seats for the coils and/or magnets needed for the operation of the apparatus can be underneath the magnetic surface 2, for example by means of deep grooves.

In this case, the ferromagnetic material connection that interconnects the different magnetic poles and that substantially replaces the resin must be such as to have the minimum thickness possible. This is to ensure both the mechanical structurality and the minimum magnetic flux conduction between the poles. The minimum flux conduction between the poles allows not considerably affecting the magnetic field generated by the magnetic poles 3.

As can be seen in FIG. 1, all the magnetic poles 3 that form the magnetizable surface 2 are provided with measuring areas 5 on the free surface thereof.

In particular, each magnetic pole 3 of the magnetizable surface 2 is provided with four measuring areas 5 on the free surface 4 thereof, but even just two are enough, as shown in the embodiment in FIG. 10, which will be described hereinafter.

In alternative embodiments, only one part (or group) of the magnetic poles 3 of the magnetizable surface 2 may be provided with measuring areas 5 configured as described herein, for example only the group of the twelve peripheral magnetic poles.

Each magnetic pole of the group has a free surface (of the magnetic pole) where at least two measuring areas 5 are defined.

In other words, one part (or group) of the magnetic poles 3 forming the magnetizabile surface 3, has at least two measuring areas 5 on the free surface of each magnetic pole of the group; each measuring area 5 is associated with at least one sensor 6 adapted to detect a magnetic flux exiting from said area.

Each measuring area 5 is associated with at least one sensor element 6 adapted to detect a magnetic flux exiting from the respective measuring area.

The sensor element 6 may for example be any system or group of systems able to detect the magnetic field either directly or indirectly. For example, it may be a HALL sensor which directly measures B. However, in order to be placed on the magnetic pole 3, these sensors require the creation of an air gap in the circuit which may decrease the performance of the magnetic apparatus.

Figure 4:
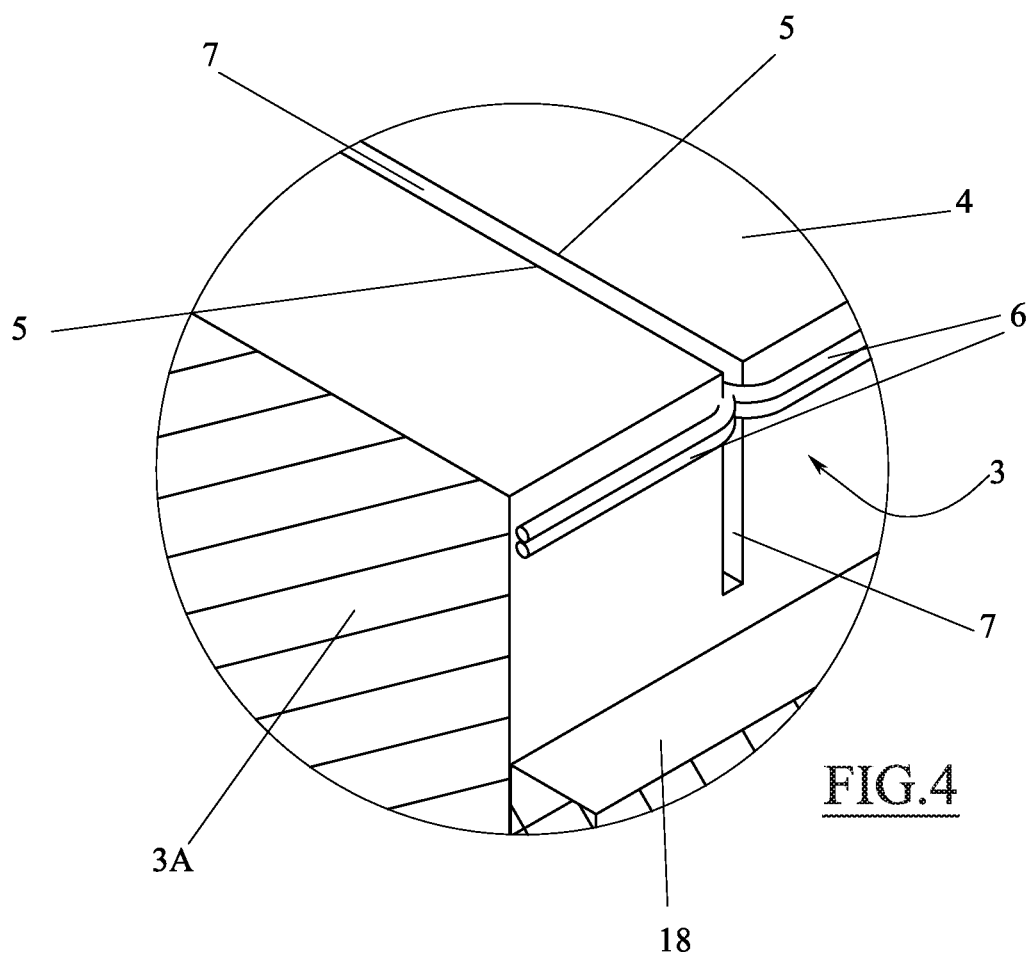
FIG. 4 is an enlarged view of the portion enclosed within the circle in FIG. 3.

Preferably, as can be seen from the analysis in FIG. 4, the sensor element comprises at least one coil 6 adapted to detect a magnetic flux which crosses said measuring area 5 during at least one activation transient of the magnetizable surface 2.

It must be said that in the example, each coil 6 surrounding the respective measuring area 5 consists of two turns. Obviously, coil 6 may also be formed by one turn only or by a greater or lesser number of turns depending on the project requirements.

With a coil 6 formed by multiple turns it is possible to obtain induced voltages values of such a magnitude that cannot be significantly altered by the noise typically present in the environments in which they operate.

Figure 3:
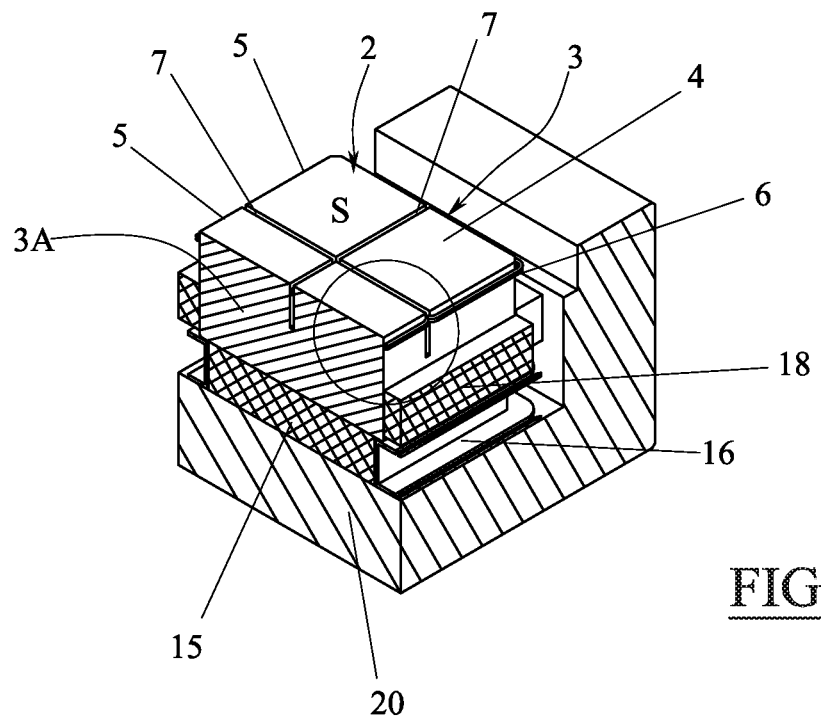
FIG. 3 is a partial section taken along line III-III in FIG. 1.

As is seen in FIG. 3, at least one part of the perimeter of each measuring area 5 is delimited by a channel 7 made in the magnetic pole 3 and housing at least one part of coil 6. Channel 7 is open on the free surface 4 of the magnetic pole 3 and this configuration makes the placement of coils 6 particularly simple.

In particular, only one part (about half) of coil 6 is inserted in channel 7, while the other part thereof externally surrounds the part of the magnetic pole 3 located peripherally of each measuring area 5.

It must be said that within channel 7, part of the various coils associated with the four measuring areas of the magnet can be overlapped or side by side.

The easiest way to make channel 7 is to form a groove (such as by chip removal) on the free surface of the magnetic pole 3. The optimal configuration of the groove (i.e. the one that maximizes the surface of the measuring areas 5 and allows an optimal subdivision of the surface of the magnetic pole 3) may be the cross configuration shown in FIGS. 1 to 4.

In fact, with two milling operations perpendicular to the sides of the magnetic pole 3, which cross at the center of the latter, it is possible to divide the free surface 4 into four measuring areas 5, obtaining an excellent coverage with a really simple machining.

Figure 10:
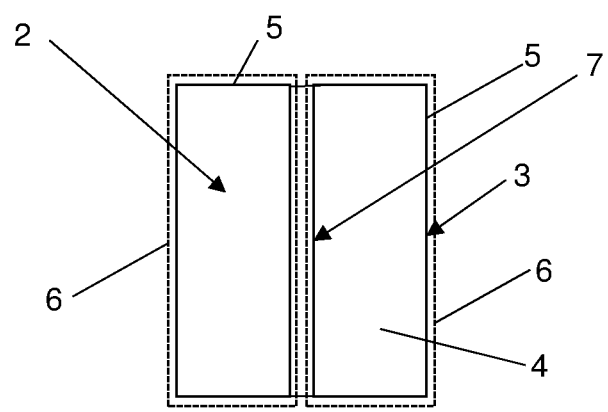
FIG. 10 shows a possible alternative configuration of a magnetic pole with which the apparatus according to the present invention is made.

Of course, the measuring areas 5 may have a different shape, such as the rectangular one shown in the above FIG. 10. However, the shape and surface of the measuring area may be any, according to the technical requirements and also to the shape of the free surface 4 of the magnetic poles.

In fact, the magnetic poles may have a circular, rectangular or any other shape according to the requirements. It is however important that at least two measuring areas are provided on at least one part of the magnetic poles that at least partially define the magnetizable surface 2.

Figure 5:
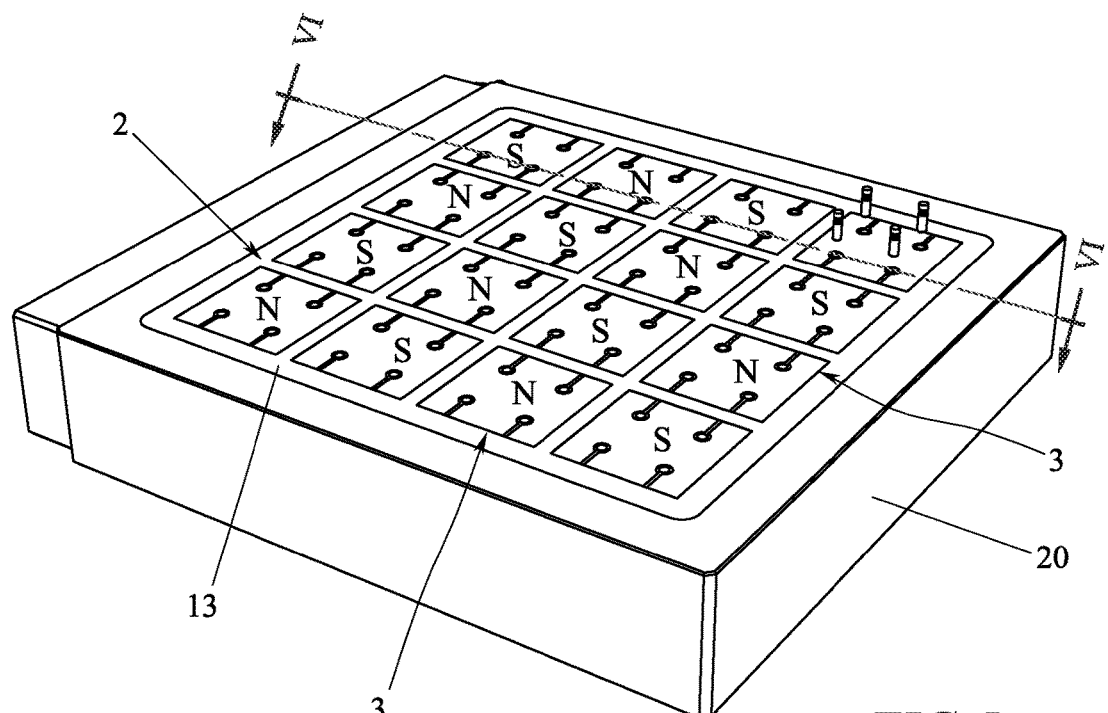
FIG. 5 is a perspective view of a different embodiment of the magnetic module in FIG. 1.
Figure 6:
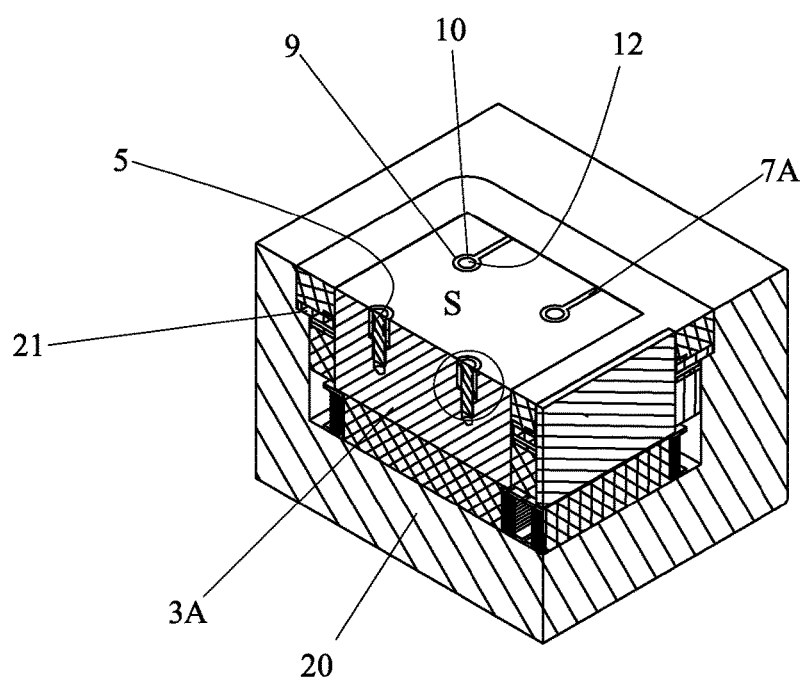
FIG. 6 is a partial section taken along line VI-VI in FIG. 1.
Figure 7:
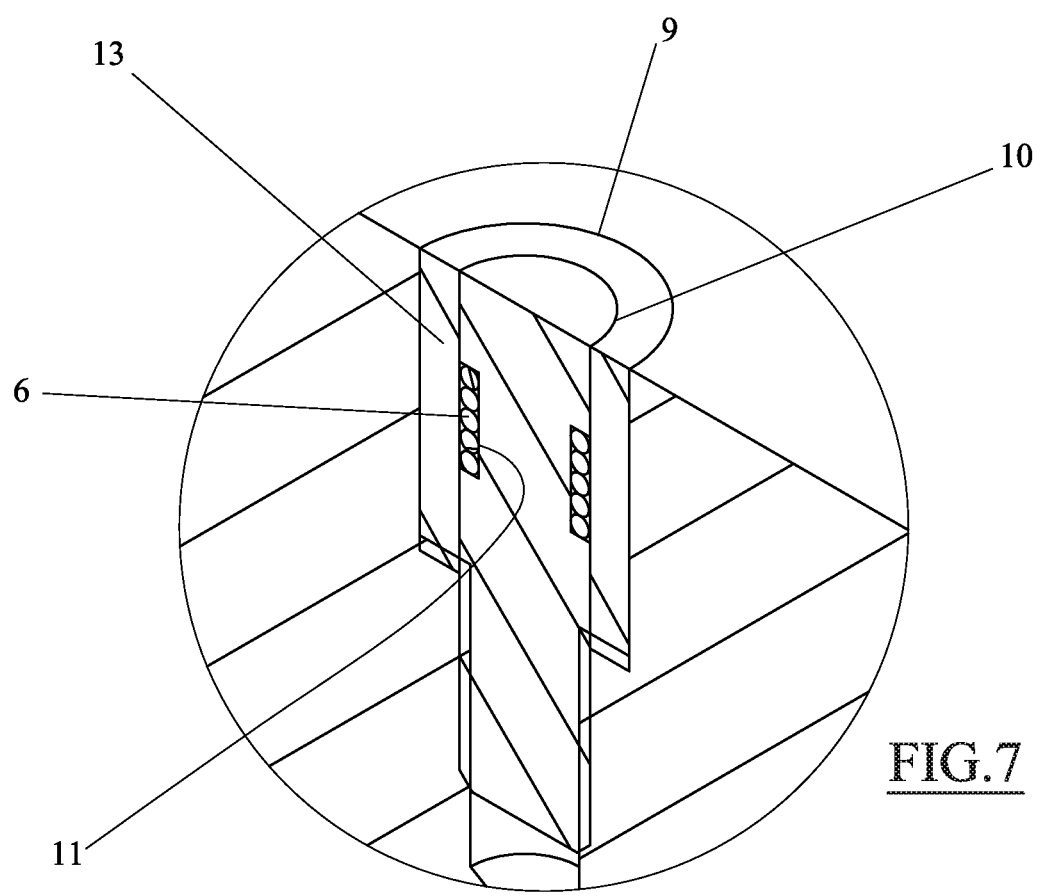
FIG. 7 is an enlarged a view of the detail enclosed in the circle in FIG. 6.

A particularly effective embodiment of the measuring areas 5 is that shown in the embodiment of FIGS. 5-7.

In these figures, the same reference numerals used above are used to denote parts functionally similar to those already described. Therefore, these parts are not described again.

In this case, the measuring system may comprise a coil 6 with round section placed at the center of gravity of each of four sections in which the surface of magnetic pole 3 is divided. The section of the coil may of course be any, such as square.

In the embodiment in FIG. 6, it is seen that channel 7 in which the coil is accommodated is formed between the peripheral surface of a hole 9 made in the magnetic pole and the peripheral surface of a ferromagnetic core 10 accommodated in hole 9.

The ferromagnetic core 10 may be screwed (or otherwise attached) within hole 9 and advantageously, head 12 of the ferromagnetic core is aligned with the free surface 4 of the magnetic pole 3.

Coil 6 may be wound about the ferromagnetic core 10, for example at a surface recess 11 thereof.

As can be seen in FIG. 5, each magnetic pole 3 can be provided with four measuring areas 5, whose surface coincides with that of head 12 of the ferromagnetic core 10. Each ferromagnetic core 10 is placed at a center of gravity of a sector of the magnetic pole 3.

In this way, measuring the flux in a barycenter position, all the measurement can be extended to the relative area of which the sensor is the center of gravity, rather than using interpolations to calculate the surface flux pattern.

It should be noted that each hole 9 in which the ferromagnetic core 10 is accommodated is connected by an auxiliary channel 7A leading on the side of the magnetic pole 3, and allowing the electrical connection of coil 6.

As with gaps 21, channels 7 of all the embodiments (and the auxiliary channels 7A) can also be filled with resin 13 in order to create a regular magnetizable surface 2.

For example, the resin may be of the epoxy type.

To complete the description of the magnetic apparatuses described above, it is noted that each magnetic pole 3 can be of the type known as electro-permanent (as shown in FIGS. 2 and 6).

In this case, each of the magnetic poles 3 may comprise a core 3A associated with at least one reversible magnet 15 coupled to a reversion coil 16, and at least one permanent magnet 18 (in the case of FIG. 4, one for each side of the pole) which is also associated with said core 3A.

The magnetic field generated by the at least one reversible magnet is substantially equal to the sum of the magnetic fields generated by the permanent magnets 18.

Therefore, when the magnetic field generated by the reversible magnet is opposed to that generated by the permanent magnets, the magnetizable surface 2 is neutral. When the magnetic field of the reversible magnet is added to that of the permanent magnets, the magnetizable surface is magnetized and thus able to exert a magnetic force of attraction of a ferromagnetic material.

It must be said that the apparatus according to the present invention can be provided with magnetic field generation systems other than those described above. For example, it may be of the type with electromagnets and thus each of the magnetic poles 3 may comprise a core associated with a magnetization coil that generates a magnetic field only when this is crossed by electric current and thus active.

Alternately, a permanent magnet magnetic apparatus may be provided, wherein the magnetic poles 3 may be associated with a permanent magnet and a mechanical system (such as lever) adapted to change the combination between a ferromagnetic material and the permanent magnet at the magnetizable surface, so as to magnetize it or not.

By the system described above in its different variations, it is possible to analyze and measure the force produced by a magnetizable surface 2 or subsections thereof. In particular, this system involves the integration of a plurality of flux sensors, made with simple turns buried in the magnetic circuit of at least one part of the magnetic poles of the magnetizable surface. This allows obtaining a well detailed force profile associated with a specific workpiece to be anchored and to a specific magnetizable anchoring surface.

The operation of the invention is clear to a man skilled in the art and is substantially as follows.

With reference for example to FIG. 1, it can be seen that a piece of ferromagnetic material placed on the magnetizable surface 2, when active, forms a preferential passage path for the magnetic flux from the north poles to the south poles. The anchoring force will be a function of the magnitude of the flux crossing the system.

In particular, assuming that the flux through said magnetic poles 3 in the proximity of their free surface 4 is equal to Ø and assuming that such a flux is even, it is possible to calculate the relative magnetic induction by the formula:

$$B=\emptyset/S \qquad \text{R1:}$$

where B is the magnetic induction and S is the flux crossing surface.

Knowing B, it is possible to calculate the surface force density P by means of simple relationships related to $B^2$ and known in the literature, such as:

$$P=B^2/2\mu_0 \qquad \text{R2:}$$

Each coil 6, during the activation of the magnetizable surface 2, will generate a voltage at its ends which is proportional to the change in the magnetic flux linked therewith.

Each coil 6 then measures the magnetic flux passing through the respective measuring area 5 located on the free surface 4 of the relative magnetic pole 3.

The voltage may be determined by the Lenz-Newman law:

$$e(t)=-n(\partial\emptyset)/\partial t \qquad \text{R3:}$$

where e(t) is the voltage generated, n is the number of turns from of which coil 6 is formed and $(\partial\emptyset)/\partial t$ is the derivative with respect to the time of the concatenated flux with coil 6 crossing the measuring surface 5.

The reversal of this relationship allows calculating the magnetic flux Ø crossing each of the measuring areas 5 described above.

Knowing the flux, induction B is calculated from relationship R1.

Knowing B, the surface force density P is obtained for example by formula R2.

The surface force density P multiplied by the surface of the measuring area 5 provides the value of the force exerted by the magnetic pole at each section.

These operations are carried out for example by a computer MC which provides an operator or a control unit associated with the magnetic module 1 with a signal related to the force calculated as above.

The signal may be a value of the force exerted by the surface and displayed on a display associated with module 1, an alarm signal or another visual signal suitably interpreted by an operator.

The presence of at least two measuring areas 5 associated with each magnetic pole 3 allows calculating the force produced by each partition of the latter in an extremely accurate manner.

This is particularly useful especially in the case that the magnetic pole is covered only partially by the ferromagnetic workpiece being machined and/or the thickness of the workpiece to be anchored or the air gap along the surface of the magnetic pole.

In practice, the present invention provides a method for detecting the anchoring force exerted on a ferromagnetic element by a magnetizable surface 2 at least partially defined by the free surfaces 4 of a plurality of magnetic poles 3, comprising the step of detecting a magnetic flux exiting from at least two distinct measuring areas 5 of the free surface 4 of at least one part of the magnetic poles 5, and associating, for example by the relationships described above, a value of the force exerted by the magnetizable surface 2 on the ferromagnetic element with said flux.

As already mentioned, the magnetic apparatus 1 may comprise a circuit like that shown in FIG. 7.

Here, each coil 6 is indicated as C1 . . . Cn. Each coil is connected to a respective amplifier A1 . . . An which reads the voltage induced at the ends of each coil installed on the magnetic poles and amplifies it.

Then, each of the signals thus obtained is filtered and/or band limited (F1, Fn) and made available to an analog to digital converter CAD.

The signals duly converted into numerical form are then processed by the computer MC.

The microcomputer MC is the numerical processor able to carry out the calculations shown in relationships R1, R2, R3, etc. (or other similar and known in the literature) and configured to physically calculate the force values through such relationships.

The forces thus obtained may be made available to an operator and/or a machine tool in integral form (sum of all the forces obtained from the various sensing coils) or as a matrix to allow the management of the two-dimensional force profile resulting from the specific anchoring operation.

Unlike the circuit described above, the one in FIG. 8 processes the series of signals coming from the different coils C1 . . . Cn.

Figure 8:
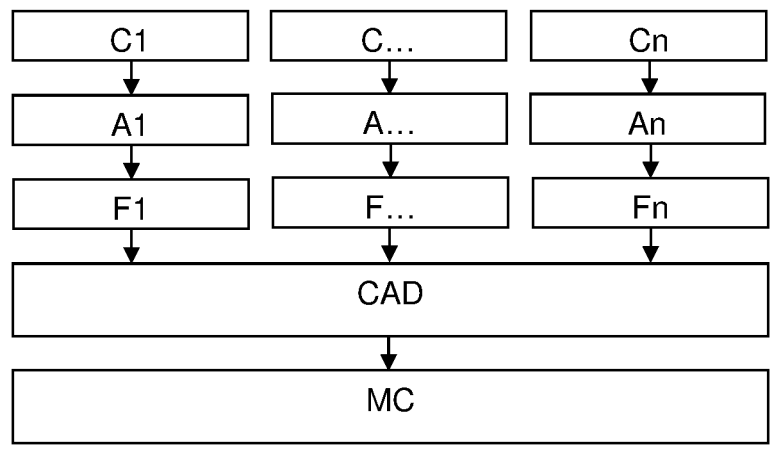
FIG. 8 and FIG. 9 are two schematic diagrams showing two different logics of determination of a magnetic force generated by the apparatus in FIG. 1.
Figure 9:
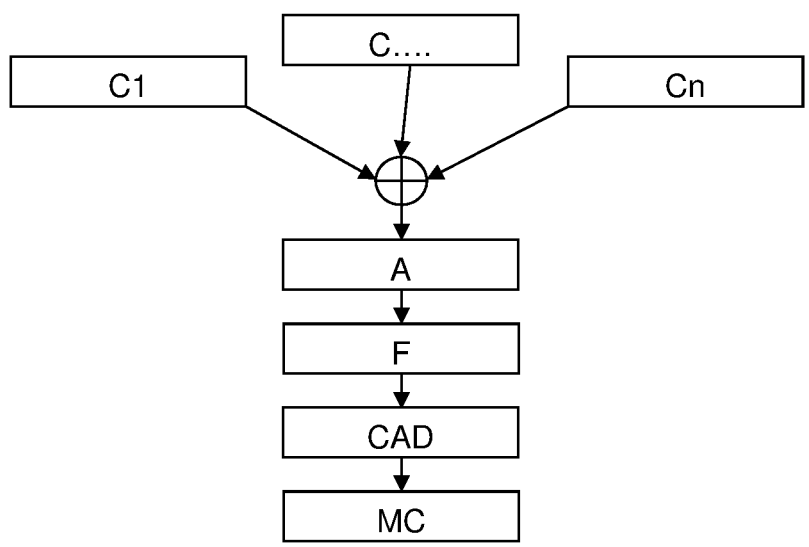

The circuit in FIG. 8 is less complex than that described above, and the physical implementation of the system is also less complex.

In this case, coils C1 . . . Cn are simply connected in series (logic module +), so as to obtain a single signal of force equal to the sum of the n constituents.

With this architecture it is however not possible to determine the two-dimensional force distribution profile.

The circuit described is still very useful to obtain the total force value.

In practice, the circuits discussed above provide a calculation method in which the anchoring force is detected by reading a signal obtained from a plurality of coils 6, each associated with one of said measuring areas 5, wherein the signal deriving from each coil 6 is separately amplified A1, An, filtered F1, Fn and converted into digital CAD before being processed by a computer MC.

A method is also provides wherein the signal of all coils 6 is added S, amplified A, filtered F and converted into digital CAD before being processed by a computer MC.

Starting from the flux measurements obtained, it is also possible to use two-dimensional interpolations to find the flux values in unmeasured points starting from those measured ones, or to fit, with regression methods, functions of known shape in the calculated points in order to determine the parameters of said functions.

The embodiments described are particularly useful for example to lift a mass of ferromagnetic material.

In this case, an indication of the gripping force developed by the magnetizable surface 2 can be processed jointly, for example, with the information about the weight of the iron mass obtained from a dynamometric cell. This can allow the generation of a positive signal in the event that there are all the safety conditions, and a negative signal otherwise.

Last but not least, possible field of application is the machine tool industry, where knowing the anchoring force of the workpiece to be machined may allow, in combination with the use of other analysis technologies, to automatically managing the cutting parameters and preventing hazardous situations due to the detachment of the mass being machined, or to the displacement thereof.

Various embodiments of the invention have been described but others may be conceived using the same innovative concept.

For example, the number of partitions (or measuring areas 5) may be adapted according to the best resolution required for the specific application. Moreover, the shape of the partitions may be any and not necessarily rectangular, square, circular or in any case repeatable.

As seen, in fact, the calculation procedure is independent of the shape of the measuring area 5 of the relative underlying surface.

For example, there may be applications in which the measuring areas 5 of some magnetic poles may differ from the measuring surfaces of other magnetic poles belonging to the same magnetizable surface. For example, magnetic poles may be provided with larger measuring areas 5 in the proximity of the center of the magnetic surface 2, and with smaller measuring areas (and thus offering a more precise reading) in peripheral areas of the magnetizable surface 2.

For example, this may be account for the fact that it is more likely that the central poles of the magnetizable surface are completely covered, while the outer ones risk to be less covered, depending on the geometry of the piece to be anchored.

The invention claimed is:

1. A magnetic apparatus (1) comprising a magnetizable surface (2) configured to anchor a ferromagnetic element in a removable manner and a plurality of magnetic poles (3), each provided with a free surface (4) thereof, the magnetizable surface (2) being at least partially defined by the free surfaces (4) of said plurality of magnetic poles (3) placed side by side, characterized in that on the magnetizable surface (2) at least a part of the magnetic poles (3) is arranged in a group, each free surface (4) of each magnetic pole (3) of the group having at least two measuring areas (5), each measuring area (5) being associated with at least one sensor (6) adapted to detect a magnetic flux exiting from said area.

2. A magnetic apparatus (1) according to claim 1, wherein the sensor element comprises at least one coil (6) adapted to detect a magnetic flux which crosses said measuring area (5) during at least one activation transient of the magnetizable surface.

3. A magnetic apparatus (1) according to claim 2, wherein at least one part of the perimeter of the measuring area (5) is delimited by a channel (7) made in the magnetic pole (3) which houses at least one part of the coil (6), the channel (7) being open on said free surface (4) of the magnetic pole (3).

4. A magnetic apparatus (1) according to claim 3, wherein the channel (7) is defined by a groove made on the free surface of the magnetic pole.

5. A magnetic apparatus according to claim 4, wherein the groove is cross-shaped and divides the free surface (4) of the magnetic pole (3) into four measuring areas (5).

6. A magnetic apparatus (1) according to claim 3, wherein the channel (7) is obtained between the peripheral surface of a hole (9) made in the magnetic pole and the peripheral surface of a ferromagnetic core (10) housed in the hole and/or wherein the ferromagnetic core (10) is screwed in said hole (9) and/or wherein the coil (6) is wound about the ferromagnetic core (10) at a surface recess (11) thereof and/or wherein the head (12) of the ferromagnetic core is aligned with the free surface (4) of said pole and/or wherein the ferromagnetic core (10) is positioned at a barycenter of a sector of the magnetic pole (3).

7. A magnetic apparatus (1) according to claim 3, wherein an insulating resin (13) is arranged inside the channel.

8. A magnetic apparatus (1) according to claim 1, wherein each of said magnetic poles (3) comprises a core (3A) associated with at least one reversible magnet (15) coupled to a reversion coil (16) and at least one permanent magnet (18) also associated with said core (3A) and/or wherein the magnetic field generated by the at least one reversible magnet (15) is substantially equal to the magnetic field generated by the at least one permanent magnet (18).

9. An apparatus according to claim 1 wherein each of said magnetic poles (3) comprises a core associated with a magnetizing coil and/or wherein each of said magnetic poles (3) is associated with a permanent magnet and a mechanical system adapted to modify the combination between a ferromagnetic material and a permanent magnet at said magnetizable surface.

10. A method for detecting the anchoring force exerted on a ferromagnetic element by a magnetizable surface (2) at least partially defined by the free surfaces (4) of a plurality of magnetic poles (3), at least a part of the magnetic poles (3) being arranged in a group, comprising the step of detecting a magnetic flux exiting from at least two distinct measuring areas (5) formed on each single free surface (4) of each magnetic pole (3) of the group, and associating a value of the force exerted by the magnetizable surface (2) on the ferromagnetic element with said flux.

11. A method according to claim 10, wherein said anchoring force is detected by reading a signal obtained from a plurality of coils (6), each associated with one of said measuring areas (5) and/or wherein the signal deriving from each coil (6) is separately amplified (AI, An), filtered (FI, Fn) and converted to digital (CAD) before being processed by a computer (MC) and/or wherein the signal of all coils (6) is added (S), amplified (A), filtered (F) and converted to digital (CAD) before being processed by a computer (MC).

* * * * *